Nov. 10, 1970 H. WINTER 3,539,743

ELECTROFLUIDIC SWITCHING CIRCUIT

Filed Aug. 10, 1967 5 Sheets-Sheet 1

INVENTOR
H. WINTER
BY D. E. Snedeker
ATTORNEY

Nov. 10, 1970 H. WINTER 3,539,743

ELECTROFLUIDIC SWITCHING CIRCUIT

Filed Aug. 10, 1967 5 Sheets-Sheet 2

Nov. 10, 1970 H. WINTER 3,539,743

ELECTROFLUIDIC SWITCHING CIRCUIT

Filed Aug. 10, 1967

5 Sheets-Sheet 3

Nov. 10, 1970 H. WINTER 3,539,743

ELECTROFLUIDIC SWITCHING CIRCUIT

Filed Aug. 10, 1967 5 Sheets-Sheet 4

Nov. 10, 1970 H. WINTER 3,539,743

ELECTROFLUIDIC SWITCHING CIRCUIT

Filed Aug. 10, 1967 5 Sheets-Sheet 5

United States Patent Office 3,539,743
Patented Nov. 10, 1970

3,539,743
ELECTROFLUIDIC SWITCHING CIRCUIT
Harry Winter, Franklin Township, Somerset County, N.J., assignor to Bell Telephone Laboratories, Incorporated, Murray Hill and Berkeley Heights, N.J., a corporation of New York
Filed Aug. 10, 1967, Ser. No. 659,686
Int. Cl. H01h *29/28*
U.S. Cl. 200—81.6 4 Claims

ABSTRACT OF THE DISCLOSURE

A laminate array of fluid-pressure-operated metallic-contact switching elements are operatively associated through a foraminous interface with fluid logic elements. The individual fluid-pressure-operated switching elements each comprise an hourglass-shaped capillary tube having a mercury globule therein which can be switched back and forth between the two ends of the tube by fluid pressure, the mercury bridging a pair of contacts when disposed at one of the tube ends.

BACKGROUND OF THE INVENTION

This invention relates to switching circuits and, more particularly, to switching circuits which selectively effect an electrical metallic contact connection between one or more of a plurality of input conductors and one or more of a plurality of output conductors.

A general object of this invention is the improvement and simplification of such switching circuits through the use of batch fabrication techniques.

The trend in the design of present day electronic circuits, such as for telephone systems, computer systems, information handling systems and the like, is toward ever-increasing application of integrated circuit technology permitting the employment of batch fabrication techniques in manufacture. Significant improvements have been achieved in size and cost of the logic, control and processing circuitry for these systems. However, little or no success has been attained heretofore in extending these techniques to the peripheral units, such as to the switching circuits. Thus, present telephone systems, even electronic telephone systems, still employ electromechanical switching circuits in the form, for example, of the familiar crossbar switch and reed switch networks.

Various arrangements have been proposed employing electronic switching devices in switching circuits. Although satisfactory in certain applications, the use of electronic switching devices has been found generally unsuitable for telephone switching networks in that they fail to meet the overall performance of metallic contacts, as provided by the present electromechanical switching circuits. in particular, metallic contacts provide two stable states; one a very high open contact impedance and the other a very low closed contact impedance, characteristics which are essential for a speech path switching device. However, present metallic contact switching circuits suffer from various disadvantages related to cost, size, weight, power consumption, and mechanical contact phenomena.

SUMMARY OF THE INVENTION

A principal object of this invention, therefore, is to provide a switching circuit havng the desirable characteristics of known metallic contact switching circuits but which is more economical, compact, and rugged, and which is substantially free from the disadvantages of mechanical contact phenomena.

A further object of this invention is to provide a simple, economical and reliable, metallic contact switching circuit which can be batch-fabricated utilizing known integrated circuit technology.

In an illustrative embodiment of the present invention, the above and other objects are attained through the combination of fluid logic components and fluid-pressure-operated metallic contacts in an integrated electrofluidic switching circuit susceptible of batch fabrcation. Specifically, an illustrative embodiment of the invention comprises alternating laminations of a matrix of fluid logic components and of a matrix of fluid-pressure-operated metallic contact crosspoints responsive to associated ones of the fluid logic components. Thus, under control of the fluid logic arrangement, selected ones of the matrix crosspoints are operated to effect an electrical metallic contact connection between one or more of a plurality of input conductors and one or more of a plurality of output conductors. The controlling fluid logic input signals are derived from electrical digital addressing signals through an electric-to-fluidic converter. The fluid logic, therefore, in addition to operating the metallic contacts at selected matrix crosspoints, performs any necessary addressing signal translation and accesses the proper matrix crosspoints.

An electrofluidic switching circuit in accordance with the present invention, besides attaining the objects set forth above, provides a further important advantage over electromechanical switching circuits in that there is no interaction between the controlling and controlled circuits. This may be readily appreciated from the fact that the fluid logic does not conduct current nor does it radiate electromagnetic energy.

In accordance with one aspect of my invention, each metallic contact at a matrix crosspoint is provided by an electrofluidic switching device comprsing two compartments or chambers interconnected with one another through a restricted passage, in the manner, for example, of an hourglass-shaped structure. One of the compartments contains an electrically conductive material, such as mercury, of sufficient quantity and of sufficiently high surface tension to prevent free movement of the material through the restricted passage. A pair of electrical contacts are disposed in at least one of the compartments so as to be bridged by the conductive material when the material is in the one compartment, thereby providing an electrical connection between the bridged pair of contacts.

Individual fluid pressure paths are associated with each of the compartments and are connected to the fluid logic. Increasing the fluid pressure in one of the fluid pressure paths, under control of the fluid logic, effects transfer of the conductive material from the compartment associated with the one path through the restricted passage into the other compartment. The fluid pressure paths are connected to the associated compartments through a foraminous interface which prevents the conductive material from entering the fluid pressure paths, without unduly restricting the fluid pressure flow therethrough.

According to a further aspect of my invention, two or more such electrofluidic switching devices may be connected advantageously in parallel or in tandem for concurrent operation of a number of metallic contacts from a single pair of fluid pressure paths. Moreover, in tandemly-connected devices it will be readily appreciated that with the exception of the two compartments connected to the fluid pressure paths, all of the compartments are isolated from the fluid pressure paths. This is particularly advantageous in applications requiring switching of relatively high currents. By disposing the electrical contacts in the isolated compartments, any deleterious effects, such as may be caused by arcing when the electrical contact connection is broken, will be isolated from the fluid pressure paths. Thus, for example, if mercury is used for bridging the electrical contacts, any vapor produced by arcing will be retained in the isolated compartments for condensation and will be prevented from entering the fluid pressure paths.

BRIEF DESCRIPTION OF THE DRAWINGS

The above and other objects and features of the invention may be fully apprehended from the following detailed description and the accompanying drawing in which.

Figure 1:
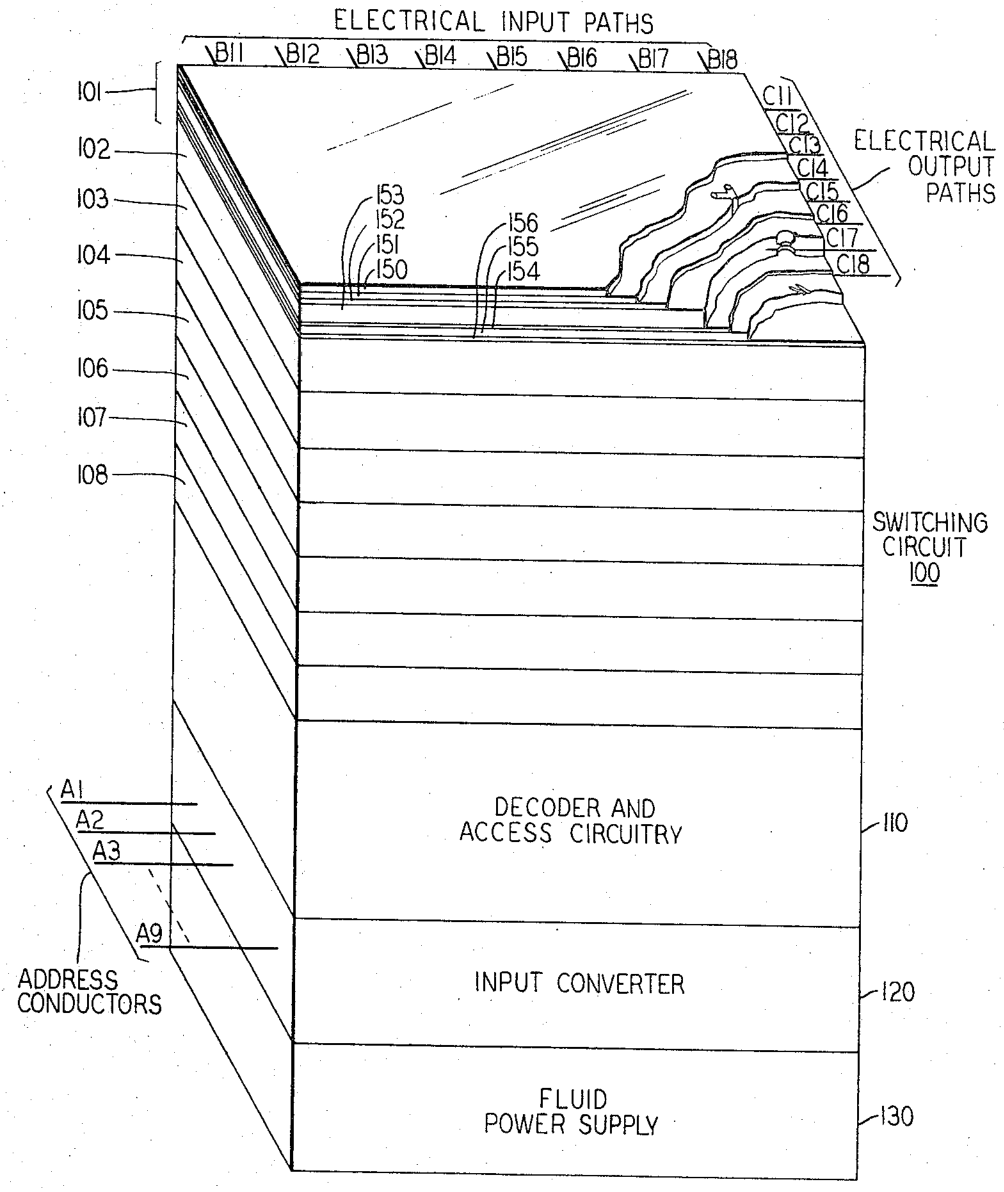
FIG. 1 is a pictorial representation of an illustrative embodiment of an electrofluidic switching circuit in accordance with the principles of my invention.
Figure 2:
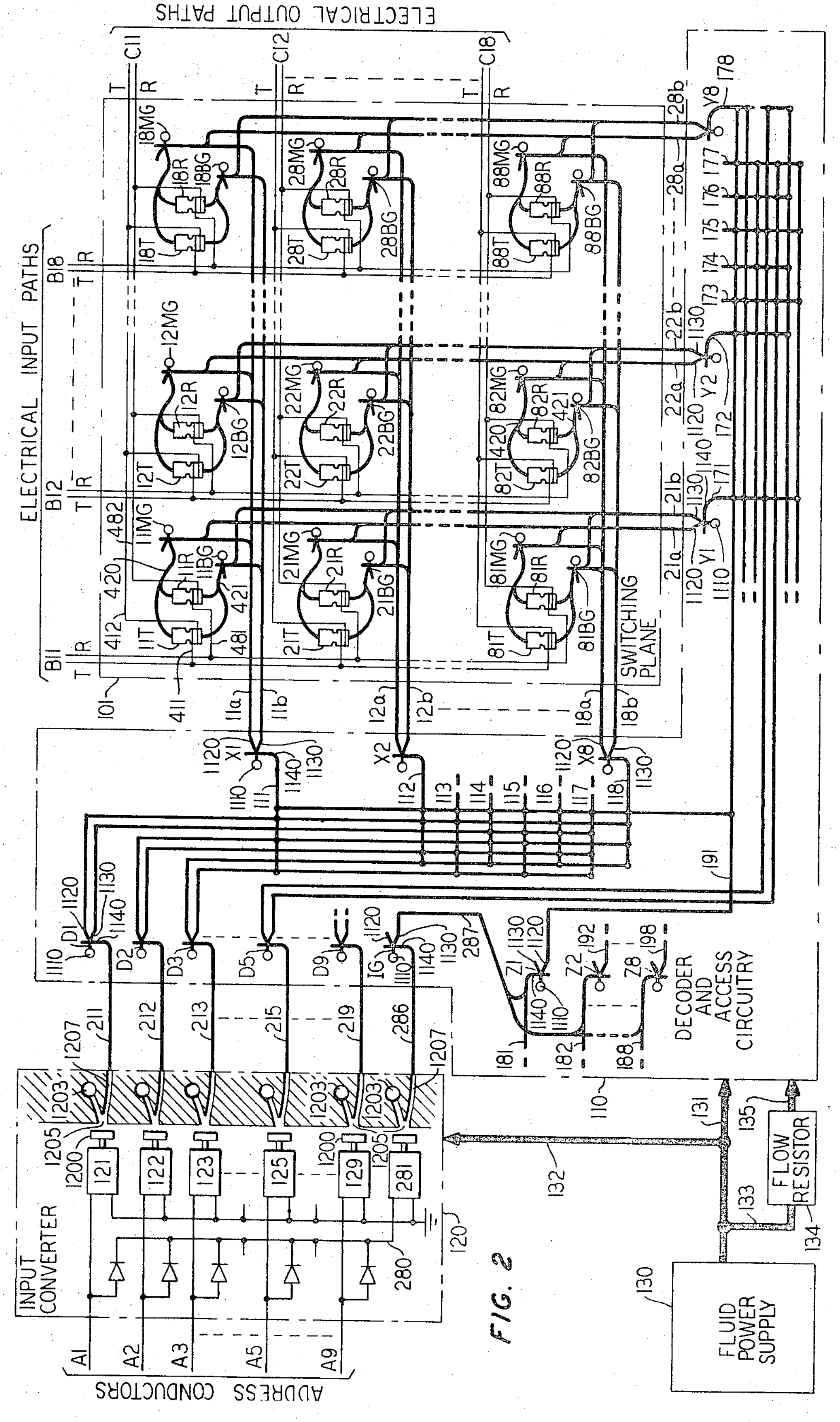
FIG. 2 is a block diagram of a portion of the illustrative embodiment of FIG. 1 including a schematic diagram of an illustrative electrofluidic switching matrix according to my invention.

For the purposes of description the illustrative embodiment of the present invention shown in FIG. 1 and 2 of the drawing is depicted in a switching network such as employed in a telephone system. The switching network illustratively comprises electrofluidic switching circuit 100 including switching planes 101 through 108, decoder and access circuitry 110, input converter 120, and fluid power supply 130. Each of switching planes 101 through 108 comprises a coordinate array of fluid-pressure-operated crosspoints, illustratively numbering 64, for connecting one of a plurality of eight electrical input paths, such as input paths B11 through B18 of plane 101, to one of a plurality of eight electrical output paths, such as output paths C11 through C18 of plane 101.

In the illustrative telephone switching network embodiment herein each of the input paths comprises a tip and ring pair of conductors, designated T and R, respectively, in FIG. 2, of a telephone line. Each output path also comprises a tip and ring pair of conductors T and R, respectively, of a linking path to a respective input path of another switching network, which may be substantially similar to the line switching network of switching planes 101 through 108. It will be apparent from the description below, however, that the present invention may be employed readily in connection with other switching systems and networks, and is not limited in any manner to telephone switching systems or to the path arrangement shown in the illustrative embodiment of FIGS. 1 and 2.

Figure 3:
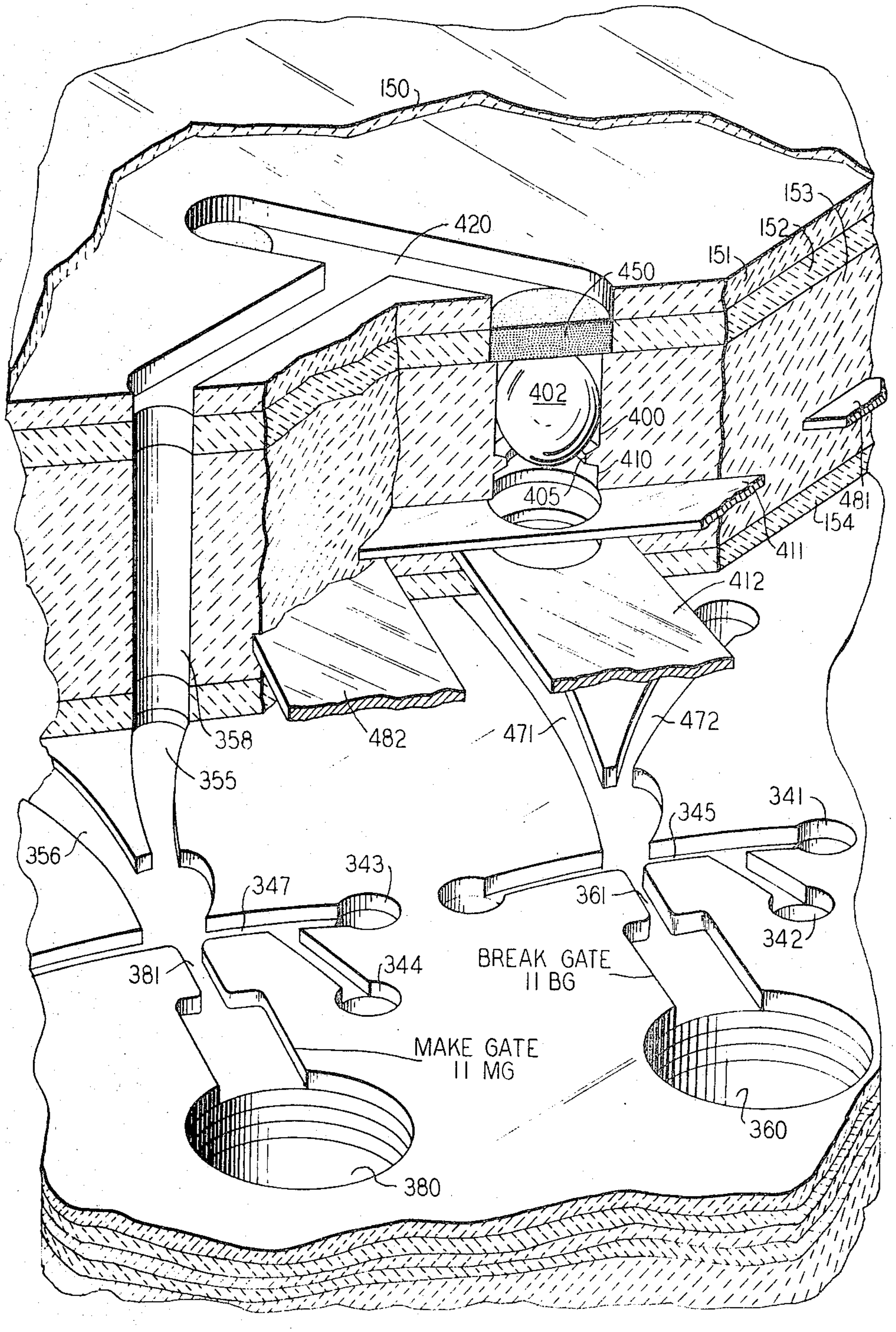
FIG. 3 shows an illustrative embodiment of an electrofluidic switching matrix crosspoint in cutaway perspective.

Advantageously the switching network of FIGS. 1 and 2 is of laminated construction, each switching plane comprising a plurality of laminations such as laminations 151 through 156 of switching plane 101 in FIG. 1. Laminated construction of the switching network permits batch fabrication thereof using known integrated circuit manufacturing techniques to provide a simple, compact and inexpensive switching network. Coverplate 150 is provided to seal the network and, if desired, may be provided with fluid apertures or ports for extending fluid pressure signals therethrough to other fluid logic arrangements or switching networks. Fluid pressure signals are transmitted through the switching network in FIG. 1 via vertical fluid channels or pressure paths formed by aligned apertures in the laminations, such as shown in FIG. 3 and described below. The vertical fluid channels, in combination with horizontal fluid channels or pressure paths disposed in the respective laminations, operatively interconnect the various fluid logic components and the fluid-pressure-operated elements of the switching network.

Crosspoint electrical connections between the individual input and output paths of the switching network are effected selectively by the fluid-pressure-operated crosspoints of switching planes 101 through 108 in accordance with electrical addressing signals on address conductors A1 through A9. In a telephone switching system, for example, addressing signals may be provided on address conductors A1 through A9 by the marker or common control circuitry, such as in response to the dialing or keying of a telephone number. Input converter 120, in turn, converts the electrical addressing signals on address conductors A1 through A9 into corresponding fluid pressure signals. For this purpose, input converter 120 may comprise any known electric-to-fluidic converter, such as the simple solenoid arrangement shown schematically in FIG. 2 of the drawing. Advantageously, however, input converter 120 may comprise a converter particularly suited to batch fabrication techniques, such as the type disclosed in D. J. Thomson patent application Ser. No. 659,794, filed Aug. 10, 1967, or in L. G. Anderson-D. J. Thomson patent application Ser. No. 659,698, filed Aug 10, 1967.

Decoder and access circuitry 110 receives the fluid pressure signals from converter 120 via interconnecting vertical fluid channels therebetween (not shown), performs any necessary decoding and translation of the addressing signals, and steers appropriate output fluid signals through vertically aligned fluid channels in switching planes 101 through 108. Decoder and access circuitry 110 advantageously comprises a laminated arrangement of fluid logic components interconnected in known manner via various vertical and horizontal fluid channels in the laminated arrangement. Suitable fluid logic components and arrangements for use in decoder and access circuitry 110 are well known in the art and are disclosed, for example, in "Fluidics," published by Fluid Amplifier Associates, Incorporated, 1965.

The fluid pressure flow for operating the fluid logic and the switching plane crosspoints is provided by fluid power supply 130 and is extended to the switching network through vertical channels therein. The working fluid, as is known in the art, may be gaseous or liquid, though an inert gas such as nitrogen is usually preferred. Numerous arrangements are known in the art, such as diaphragm compressors, which may be included in fluid power supply 130 for providing the appropriate working fluid pressure. Moreover, the fluid pressure need not be provided continuously for applications such as in the telephone system embodiment of FIGS. 1 and 2, but rather may be provided intermittently during the times required for actual switching operation.

Figure 4:
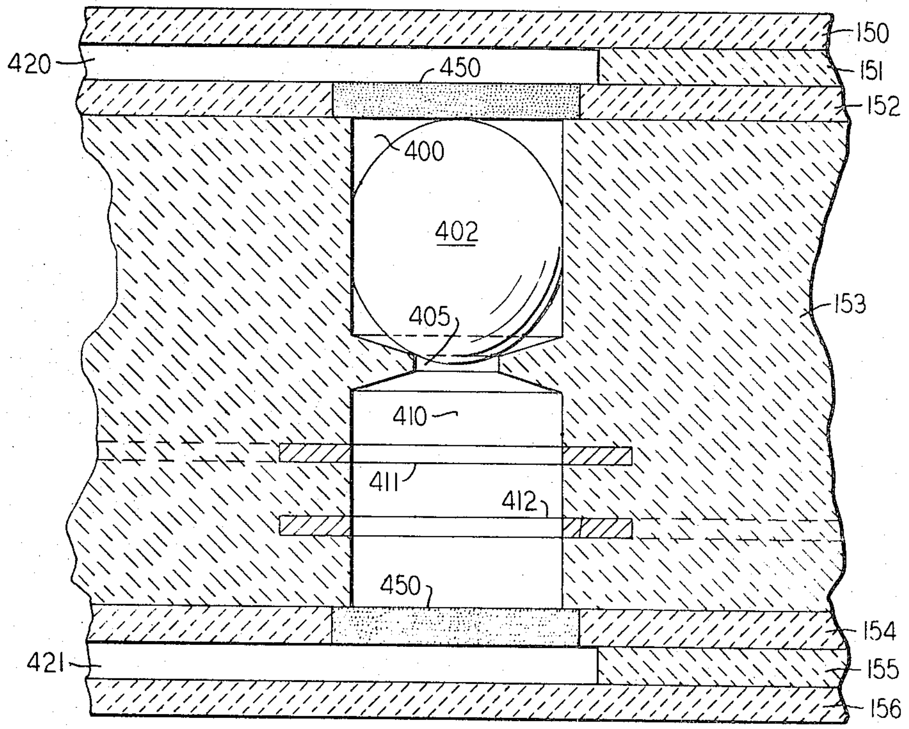
FIG. 4 is a sectional view of an electrofluidic switching device shown in the illustrative matrix crosspoint of FIG. 3.

Each metallic contact connection at a crosspoint in switching planes 101 through 108 is provided by an electrofluidic switching device which may be shaped generally in the manner of an hourglass structure, as shown illustratively in greater detail in FIGS. 3 and 4. In the illustrative embodiment herein two such switching devices are provided at each crosspoint, one associated with the tip conductors of the input and output paths and the other associated with the ring conductors. Both switching devices at a particular crosspoint are operated in parallel in the manner described below to make or break an electrical connection between the associated input and output paths.

Each crosspoint switching device comprises two compartments or chambers 400 and 410 interconnected with one another through a restricted passage 405, as shown in FIGS. 3 and 4. One of the compartments of the switching device, such as compartment 400, contains an electrically conductive material 402, such as a globule of mercury, which is non-wetting and which is of sufficient quantity and of sufficiently high surface tension to prevent free movement of the material through the restricted passage 405. A pair of electrical contacts 411 and 412 are disposed in at least one of the compartments of the switching device, such as compartment 410, so as to be bridged by the conductive material 402 when the material is in the one compartment, thereby providing an electrical connection between the bridged pair of contacts 411 and 412.

Individual fluid pressure paths 420 and 421 are associated with switching device compartments 400 and 410, respectively, and are connected to decoder and access circuitry 110 via vertical fluid channels, such as channels 341 through 344 in FIG. 3. Increasing the fluid pressure in one of fluid pressure paths 420 and 421, under control of decoder and acess circuitry 110, effects transfer of conductive material 402 from the switching device compartment associated with the one fluid pressure path through restricted passage 405 into the other switching device compartment. For example, if the fluid pressure in fluid pressure path 420 is increased sufficiently relative to the pressure in fluid pressure path 421, conductive material 402 in compartment 400 will be urged through restricted passage 405 into compartment 410, bridging contacts 411 and 412 to provide an electrical connection therebetween.

Fluid pressure paths 420 and 421 are each connected to the associated switching device compartments 400 and 410 through a foraminous interface material 450, which may be a porous ceramic or plastic material, for example. Foraminous interface 450 prevents conductive material 402 from entering fluid pressure paths 420 and 421, without unduly restricting the fluid pressure flow therethrough. Foraminous interface 450 in effect provides a large plurality of channels through which the fluid in fluid pressure paths 420 and 421 can act on conductive material 402, the individual channels or foraminous interface 450, i.e., the pore size of material 450, being sufficiently small to prevent conductive material 402 from passing therethrough.

Figure 5:
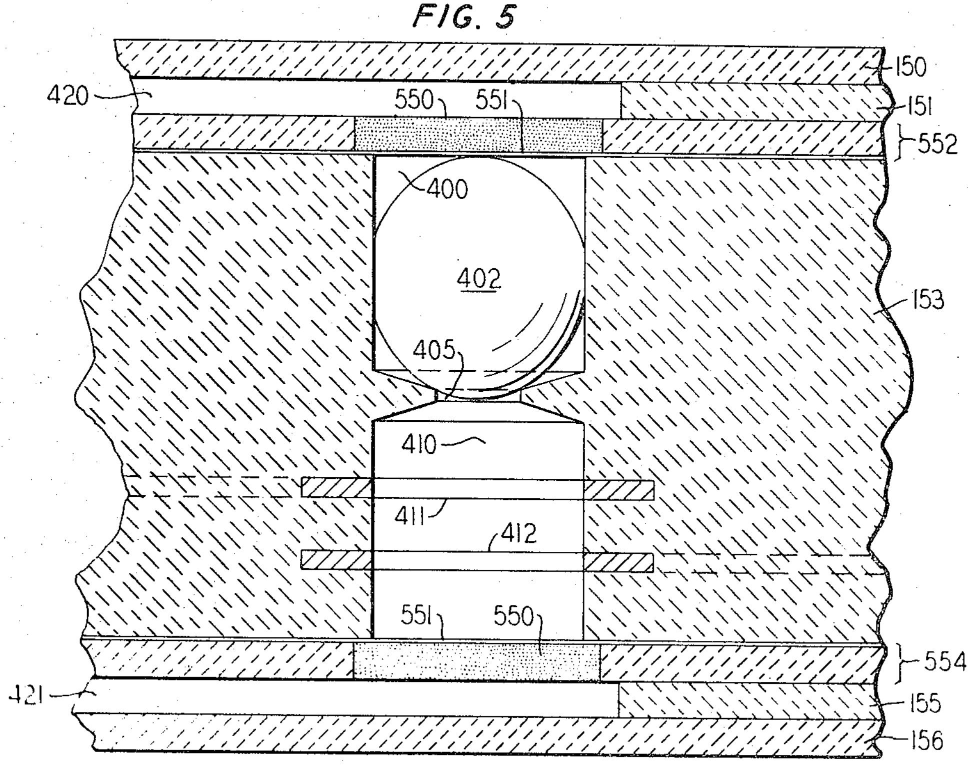
FIG. 5 is a sectional view of an alternative embodiment of an electrofluidic switching device in accordance with the principles of my invention.

An alternative electrofluidic crosspoint switching device is shown in FIG. 5 which provides for faster switching speeds, if desired. The switching device of FIG. 5 is substantially identical to the one shown in FIG. 4 (like parts in the two figures being refered to by like reference designations) except for foraminous interface laminations 552 and 554 in FIG. 5. In the device of FIG. 4, the switching speed is dependent upon the pore size and thickness of each foraminous interface 450. Any increase in the pore size of interface 450 is limted by the characteristics of conductive material 402, and any decrease in thickness is limited by the structural rigidity requirements of interface 450.

In the device of FIG. 5, however, the foraminous interfaces 552 and 554 between fluid pressure paths 420 and 421 and switching device compartments 400 and 410, respectively, comprise two layers of foraminous material 550 and 551 of different pore size and different thicknesses. Foraminous material 550 is highly porous, presenting very little resistance to fluid pressure flow, and is sufficiently thick to satisfy any structural rigidity requirements. Foraminous material 551, on the other hand, is sufficiently less porous so as to prevent the passage of conductive material 402 therethrough but is very thin so as to present little resistance to the fluid pressure flow. For example, the pore size of foraminous interface material 450 in FIG. 4 may be the same as the pore size of foraminous material 551 in FIG. 5 and ten times as small as the pore size of material 550, whereas the thickness of material 450 may be the same as foraminous material 550. Foraminous material 551 may thus advantageously comprise a thin film, on the order of 0.5 mil or so thick, disposed on foraminous material 550.

The operation of the illustrative switching network embodiment of FIGS. 1 and 2 will now be described with particular reference to the block diagram of FIG. 2 which shows the fluid paths, such as fluid channels 211 and 212, in heavy lines to distinguish them from the electrical paths shown in lighter lines, such as address conductors A1 through A9. Only one of the switching planes of switching network 100, assumed for the purposes of description to be switching plane 101, is shown in schematic form in FIG. 2, the other switching planes being substantially identical thereto. Switching plane 101, it will be recalled, comprises a plurality of electrical input paths B11 through B18 and a plurality of electrical output paths C11 through C18, each input and output path including a tip and ring pair of conductors designated T and R, respectively, in FIG. 2. Thus, referring to the crosspoint shown in FIG. 3, for example, contacts 412 and 482 are connected to the tip conductor T and ring conductor R, respectively, of one of the input paths, and contacts 411 and 481 are connected to the tip conductor T and ring conductor R, respectively, of one of the output paths.

Responsive to electrical addressing signals on address conductors A1 through A9, the tip and ring pair of conductors of any one of electrical input paths B11 through B18 can be connected selectively to the tip and ring pair of conductors of any one of electrical output paths C11 through C18. The selective electrical interconnections between the input and output paths of switching plane 101 are effected via electrofluidic switching devices 11T and 11R through 88T and 88R. Each of the electrofluidic switching devices 11T and 11R through 88T and 88R, shown schematically in FIG. 2, is substantially identical to the switching device shown in FIGS. 3 and 4 or, alternatively, to the switching device shown in FIG. 5. Two such electrofluidic switching devices are provided at each crosspoint of switching plane 101, as mentioned above and as shown in FIG. 3, one device associated with tip conductors T of an input and output path and the other device associated with ring conductors R of the input and output path. Thus, at the upper left crosspoint of switching plane 101 in FIG. 2, for example, switching device 11R is associated with ring conductor R of input path B11 and output path C11, and switching device 11T is associated with tip conductors T of input path B11 and output path C11.

The input and output path tip and ring conductors associated with each pair of crosspoint switching devices are respectively connected to a pair of electrical contacts 411 and 412 and to a pair of electrical contacts 481 and 482 disposed in the lower compartments of the associated devices, as described above. Conductive material 402 is contained in one compartment of each switching device, which conductive material completes an electrical connection between the pair of contacts when it is located in the lower compartment of the device in FIG. 2, corresponding to compartment 410 in FIGS. 3 and 4. It is assumed initially that all crosspoint connections of switching plane 101 are broken, and thus that the conductive material of each switching device is located in the upper compartment thereof in FIG. 2, corresponding to compartment 400 in FIGS. 3 and 4.

The upper compartments of the pair of switching devices at each crosspoint in switching plane 101 are connected via a fluid pressure path 420 to the NOR output leg of a respective one of make gates 11MG through 88MG. The lower compartments of the pair of switching devices at each crosspoint are similarly connected via a fluid pressure path 421 to the OR output leg of a respective one of break gates 11BG through 88BG. Make gates 11MG through 88MG and break gates 11BG through 88BG comprise conventional fluid logic monostable OR/NOR gates, such as shown illustratively in FIG. 3.

The operation of such fluid logic gates is well known in the art and will be considered only briefly here as may be necessary to an understanding of the present invention. Make gate 11MG in FIG. 3, for example, has an OR output leg 356, a NOR output leg 355, a control input arm 347 connected to control input apertures 343 and 344, and a power input aperture 380. Fluid pressure flow from power supply 130 via channel 131 enters gate 11MG at aperture 380 and is directed through port 381. In the absence of control fluid flow from control input arm 347, the fluid flow through port 381 tends to attach to the wall of NOR output leg 355 and thus flow through leg 355 and vertical channel 358 to fluid path 420. This may be referred to as the monostable state of gate 11MG, in which substantially the entire fluid flow entering gate 11MG is directed through NOR output leg 355 over path 420 to the associated pair of crosspoint switching devices in the absence of any control input fluid flow from control arm 347. Fluid flow through path 420, as mentioned above, operates each of the switching devices at the crosspoint to switch conductive material 402 from upper compartment 400 through restricted passage 405 to lower compartment 410, thereby making the respective tip and ring connections at the particular crosspoint.

In the presence of a control input fluid flow at control arm 347 from either one or both of control input apertures 343 and 344, the power fluid flow entering gate 11MG through port 381 is deflected to OR output leg 356. Substantially no fluid flow enters NOR output leg 355. The fluid flow in output leg 356 is vented to the atmosphere or returned to power supply 130, depending upon the particular system. Upon termination of control input fluid flow through control arm 347, gate 11MG returns to its monostable state, the power fluid flow from channel 381 reattaching to the wall of NOR output leg 355 and substantially no fluid flow remaining in leg 356. Thus, in the present illustrative embodiment, make gate 11MG and each of the other make gates 12MG through 88MG may be considered as a negative AND gate, a fluid output appearing in NOR output leg 355 only during the absence of a control input at both of control apertures 343 and 344.

Break gate 11BG in FIG. 3 operates in substantially the same manner as make gate 11MG, except that the fluid output signal is taken from OR output leg 471 and the NOR output leg 472 is vented to the atmosphere or returned to power supply 130. Thus, in the absence of a control input fluid flow from control arm 345, power fluid flow through aperture 360 and port 361 is directed through leg 472 to the atmosphere or power supply 130. When a control input appears at one, or both, of control apertures 341 and 342, it is directed through arm 345 to deflect the power fluid flow from port 361 into OR output leg 471.

The fluid flow in OR output leg 471 is extended over fluid path 421 to lower compartment 410 of each of the pair of switching devices at the associated crosspoint, as mentioned above. Conductive material 402 therein is urged through restricted passage 405 to upper compartment 400, breaking the electrical connection between the tip and ring conductors at the particular crosspoint. Upon termination of control input fluid flow from control arm 345, the power fluid flow from channel 361 reattaches to the wall of NOR output leg 472. Thus, break gate 11BG and each of the other break gates may be considered as an OR gate, the fluid output appearing in output leg 471 only during the presence of inputs at one or both of control input apertures 341 and 342.

The fluid logic gates in decoder and access circuitry 110 in FIG. 2 are, illustratively, monostable OR/NOR gates substantially similar to those in switching matrix 100. Each access gate, each decoder gate and initializing gate IG has a power input aperture 1110 connected to power supply 130 via channel 131, an OR output leg 1120, a NOR output leg 1130, and a control input port or arm 1140 connected to one or more control input paths. Row access gates X1 through X8 are individually associated with respective rows of switching matrix plane 101, and column access gates Y1 through Y8 are individually associated with respective columns of switching matrix plane 101. Plane access gate Z1 is associated with matrix plane 101, similar plane access gates Z2 through Z8 being associated with switching planes 102 through 108, respectively. Decoder gates D1 through D9 are individually associated, via address fluid channels 211 through 219 and input converter 120, with respective ones of address conductors A1 through A9.

The operation of the access gates, the decoder gates and initializing gate IG is substantially the same as that described briefly above in connection with make gate 11MG and break gate 11BG. In the absence of a control input at arm 1140, power fluid input at aperture 1110 is directed out leg 1130. In the presence of a control input at arm 1140, power fluid input at aperture 1110 is switched to output leg 1120.

Input converter 120 in the illustrative embodiment of FIG. 2 comprises a plurality of solenoids 121 through 129 individually connected electrically to a respective one of address conductors A1 through A9, and solenoid 281 connected electrically to each of address conductors A1 through A9. Each of solenoids 121 through 129 and 281 has associated therewith a respective power fluid input aperture 1203. Fluid pressure flow from power supply 130 over fluid channel 132 is applied to each of apertures 1203 of input converter 120. So long as solenoids 121 through 129 and 281 are de-energized, plungers 1200 thereof are in the position shown in FIG. 2 and the fluid flow from each aperture 1203 is directed through corresponding port 1205 to the atmosphere or returned to power supply 130. Energization of a particular solenoid causes the plunger 1200 thereof to be thrust forward so as to seal port 1205 adjacent the energized solenoid, thereby directing the fluid flow from associated aperture 1203 through fluid channel 1207 to the individual address fluid channel 211 through 219 or initializing channel 286 connected thereto. In this manner the electrical addressing signals on conductors A1 through A9 are converted by input converter 120 into corresponding fluid address signals in fluid channels 211 through 219, respectively, and into an initializing gate signal in channel 286.

Assume, then, that all crosspoint connections in switching matrix 100 are broken and that power fluid flow is extended by power supply 130 over channel 132 to each of apertures 1203 in input converter 120, and over channel 131 to apertures 1110 of each of the decoder and access gates in decoder and access circuitry 110, and to the power fluid input apertures 380 of each of the make gates in switching matrix 100. Power fluid flow is extended by power supply 130 over channel 133 through flow resistor 134 and through channel 135 to input apertures 360 of each of the break gates in switching matrix 100. Flow resistor 134 reduces the pressure of the fluid flow in channel 135 to approximately one-half the pressure of the fluid flow in channel 131.

In the initial de-energized switching matrix state the power fluid flow extended to decoder gates D1 through D9 and to initializing gate IG with no control fluid input from input converter 120 is directed through output leg 1130 of each gate. The output of initializing gate IG provides fluid flow by channel 287 to the control input arm of each of plane access gates Z1 through Z8 extending the outputs of gates Z1 through Z8 over leads 191 through 198 to respective switching planes 101 through 108. Consequently, a fluid signal is initially applied to the control input arm of each row and column access gate such as access gates X1 through X8 and Y1 through Y8 in plane 101, each row and column access gate thus being switched initially to a state providing an output at the respective OR output leg 1120 thereof.

The outputs from legs 1120 of row access gates X1 through X8 and column access gates Y1 through Y8 are extended over row access channels **11*a* through 18*a* and over column access channels 21*a* through 28*a***, respectively, to the control input arm of each of the make gates 11MG through 88MG in switching plane 101. Make gates 11MG through 88MG are responsive thereto in the manner described above to direct power fluid pressure flow over the OR output leg thereof to the atmosphere or to power supply 130.

With all of row access gates XI through X8, all of column access gates Y1 through Y8, and all of plane access gates Z1 through Z8 in their switched states, no fluid flow appears in row access channels 11*b* through 18*b* or in column access channels 21*b* through 28*b*. Thus break gates 11BG through 88BG are each in their monostable state, power fluid flow being directed therethrough to the NOR output leg, and thus vented to the atmosphere or returned to power supply 130.

Assume now, by way of example, that it is desired to establish an electrical connection between the tip and ring conductors of input path B12 and the tip and ring conductors of output path C18, as indicated by suitable addressing signals on address conductors A1 through A9. For the purposes of illustration, decoder and access circuitry 110 in FIG. 2 is shown as performing a simple three-digit, binary-to-decimal translation of the fluid address signals on address channels 211 through 219. Decoder gates D1 through D3 are associated with row access gates X1 through X8 of each switching plane, decoder gates D4 through D6 are associated with column access gates Y1 through Y8 of each switching plane, and decoder gates D7 through D9 are associated with plane access gates Z1 through Z8. Selection of the matrix crosspoint of input path B12 and output path C18 in switching plane 101, therefore, is assumed to be effected by electrical addressing signals on address conductors A1 through A3, A5, and A9. Solenoids 121 through 123, 125, 129 and 281 are energized thereby to direct fluid pressure flow over respective fluid channels 211 through 213, 215, 219 and 286 in the manner described above.

The fluid flow over channels 211 through 213, 215 and 219 operates decoder gates D1 through D3, D5 and D9, respectively, switching the outputs thereof to OR output legs 1120. The fluid flow over channel 286 operates initializing gate IG, removing fluid flow from channel 287 to plane access gates Z1 through Z8. The outputs of the remaining decoder gates D4 and D6 through D8 (not shown) continue to emanate from the NOR output leg 1130 thereof. The switching of gates D1 through D3 thus removes the fluid flow from channel 118 to row access gate X8, fluid flow continuing in channels 111 through 117 to gates X1 through X7. The switching of decoder gate D5 similarly removes the fluid flow from channel 172 to column access gate Y2. The switching of decoder gate D9 removes the fluid flow from channel 181 to plane access gate Z1, the consequent switching of gate Z1 removing fluid flow from channel 191 to the row and column access gates of switching plane 101. Responsive thereto, access gates X8 and Y2 switch to their monostable state, providing fluid flow through output legs 1130 thereof to row access channel 18*b* and to column access channel 22*b*, respectively, removing the fluid flow from channels 18*a* and 22*a*.

Responsive to the concurrent termination of fluid flow in both row access channel 18*a* and column access channel 22*a*, make gate 82MG switches to its monostable state to provide power fluid pressure flow therethrough over path 420 to the upper compartments of switching devices 82T and 82R connected thereto. This effects transfer of the conductive material in switching devices 82T and 82R from the upper compartments thereof to the lower compartments, bridging the contacts disposed therein to establish an electrical connection between the tip and ring conductors of input path B12 and the tip and ring conductors of output path C18.

The illustrative matrix embodiment shown in FIG. 2 is provided advantageously with a destructive mark feature; that is, the selection and operation of a pair of switching devices at a matrix crosspoint effects the release of any previously operated switching devices in the matrix row and column defining the selected crosspoint. Thus, for example, the selection and operation of switching devices 82T and 82R in the manner described above also effects the release of any previously operated ones of switching devices 81T, 81R, 83T and 83R through 88T and 88R in the bottom row of switching plane 101 and of any previously operated ones of switching devices 12T and 12R through 72T and 72R in the second column of switching plane 101. This is accomplished by the switching of the outputs of row access gate X8 and column access gate Y2, in the manner above-described, to access channels 18*b* and 22*b*.

The output from gate X8 on channel 18*b* is applied to the control input arm of each of break gates 81BG and 83BG through 88BG, switching the respective outputs thereof to the lower compartments of each of switching devices 81T, 81R, 83T and 83R through 88T and 88R. Conductive material in the lower compartments of any of these switching devices is urged thereby into the upper compartments of the switching devices, breaking any previously established contact connections in devices 81T, 81R, 83T and 83R through 88T and 88R.

The output from gate Y2 on channel 22*b* is applied to the control input arm of each of break gates 12BG through 17BG in the second column of switching plane 101, similarly switching the respective outputs thereof to the lower compartments of switching devices 12T and 12R through 17T and 17R, breaking any previously established contact connection in these devices.

It will be noted, of course, that fluid flow over channels 18*b* and 22*b* is also applied to the control input arm of break gate 82BG associated with the selected matrix crosspoint. The output of gate 82BG is switched thereby over channel 421 to the lower compartment of switching devices 82T and 82R. However, it will be recalled that the pressure of the power fluid flow extended over channel 135 to break gate 82BG by power supply 130, and thus the pressure of the fluid flow applied over channel 421 to the lower compartments of switching devices 82T and 82R is only approximately one-half the pressure of the fluid flow applied by make gate 82MG over channel 420 to the upper compartments of devices 82T and 82R. Accordingly, the conductive material in devices 82T and 82R is urged into the lower compartments thereof to establish the selected electrical connection.

Upon cessation of the electrical addressing signals on conductors A1 through A3, A5 and A9, solenoids 121 through 123, 125, 129 and 281 release, terminating the corresponding fluid addressing signals on channels 211 through 213, 215 and 219 and terminating the fluid signal on channel 286. Decoder gates D1 through D3, D5 and D9 and initializing gate IG consequently switch to their monostable state, the outputs thereof returning to respective NOR output legs 1130, thereby reestablishing fluid flow over channels 118, 172, 181 and 287. Access gates X8, Y2 and Z1 are switched thereby to return fluid flow to respective access channels 18*a*, 22*a* and 191.

Switching devices 82T and 82R remain in their operated state, maintaining the electrical contact connection between input path B12 and output path C18, until the output of break gate 82BG is switched to the OR output leg thereof connected to channel 421. This happens, for example, when any subsequent crosspoint in the bottom row of plane 101 is selected in the manner described above, extending fluid flow over access channel 18*b* to break gate 82BG, or when any subsequent crosspoint in the second column is selected, extending fluid flow over access channel 22*b* to break gate 82BG.

Figure 6:
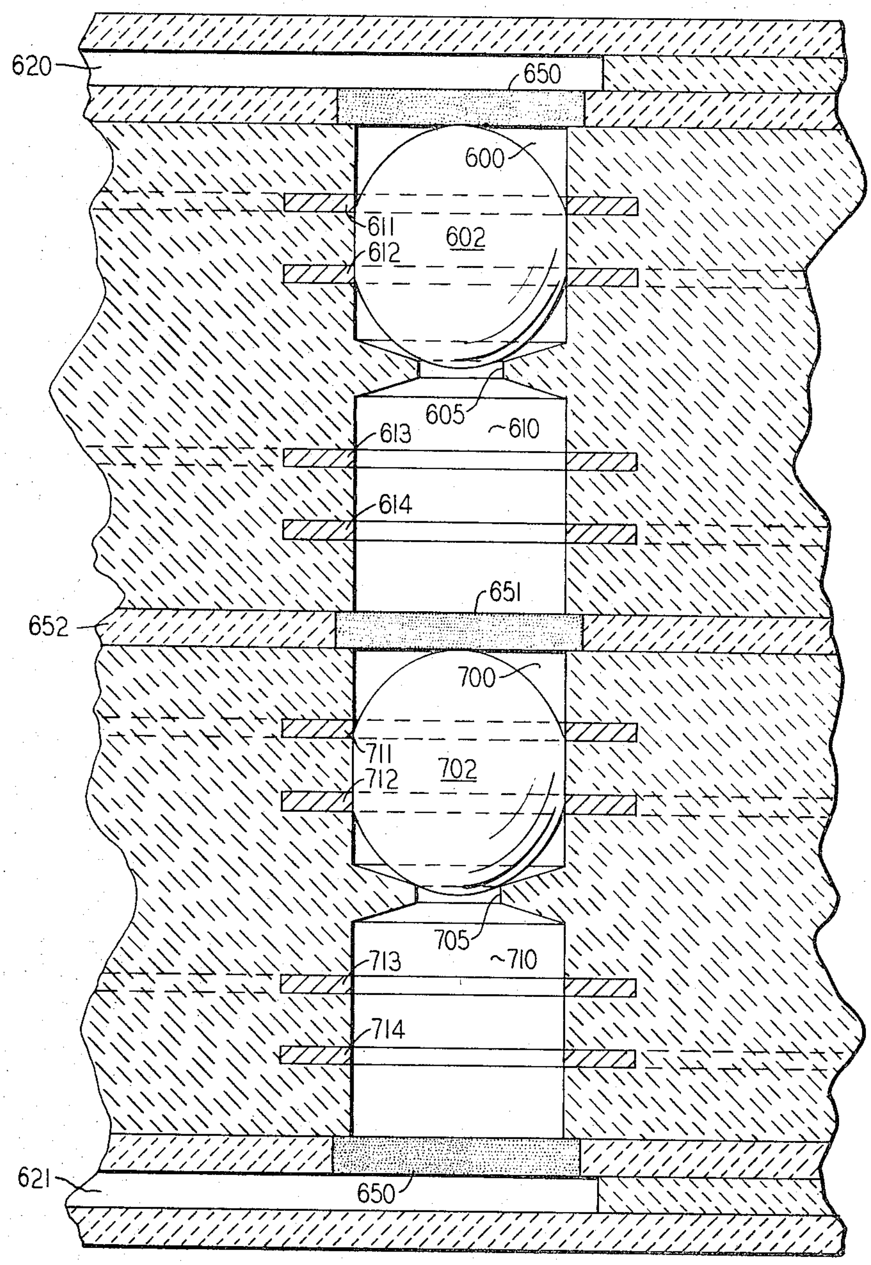
FIG. 6 is a sectional view of an illustrative embodiment of a plurality of electrofluidic switching devices connected in tandem in accordance with my invention.

According to a further aspect of my invention, two or more electrofluidic switching devices may be connected advantageously in tandem, such as shown in FIG. 6, for concurrent operation of a plurality of metallic contacts from a single pair of fluid pressure paths 620 and 621. One switching device comprises compartments 600 and 610 interconnected by restricted passage 605, and the other switching device comprises compartments 700 and 710 interconnected by restricted passage 705. The two switching devices are operatively connected for tandem operation via foraminous material 651 in layer 652.

Compartments 600 and 700 are illustratively shown in FIG. 6 as containing conductive material 602 and 702, respectively, which may comprise globules of mercury, for example. Each compartment of each device has a pair of electrical contacts disposed therein so as to be bridged by the conducitve material when the material is in the compartment. Thus contacts 611 and 612 are bridged by conductive material 602 in compartment 600, and contacts 711 and 712 are bridged by conductive material 702 in compartment 700.

Fluid pressure paths 620 and 621 are connected to compartments 600 and 710, respectively, through foraminous interface material 650. Increasing the fluid pressure in path 620, relative to the fluid pressure in path 621, effects transfer of conductive material 602 through restricted passage 605 into compartment 610, bridging contacts 613 and 614. The transfer of material 602 into compartment 610 exerts pressure through foraminous material 651 on conductive material 702, urging the latter through restricted passage 705 into compartment 710, bridging contacts 713 and 714. Subsequently, fluid pressure in path 621 can be increased, relative to the fluid pressure in path 620, to effect transfer of conductive materials 602 and 702 in a similar manner from respective compartments 610 and 710 back into compartments 600 and 700, respectively.

It will be readily appreciated from FIG. 6 that compartments 610 and 700 are isolated from fluid pressure paths 620 and 621. This is particularly advantageous in applications requiring switching of relatively high currents through contacts 613 and 614 and through contacts 711 and 712. Any deleterious effects, such as may be caused by arcing when the electrical contact connection in one or the other compartment is broken, will be isolated from fluid pressure paths 620 and 621. For example, if mercury is used as conductive materials 602 and 702, any vapor produced by arcing when contacts 711 and 712 or contacts 613 and 614 are broken will be retained in compartments 610 and 700 and will be prevented from entering paths 620 and 621.

Although the electrofluidic switching device in the illustrative embodiment above is depicted as an hourglass-shaped structure, it will be apparent that other shapes may be employed with equal facility. For example, the restriction to passage of the conductive material 402 between compartments 400 and 410 need not be by virtue of size or shape of the interconnection between the two compartments, but may be by virtue of a suitable foraminous material interposed between the two compartments. Moreover, various alternatives exist for conductive material 402, as it will be readily appreciated that material 402 need have only a conductive surface or coating for bridging the device contacts. In fact, inasmuch as fluid logic devices are operable at elevated or reduced temperatures without impairment, conductive material 402 need not be liquid at ambient temperature.

It is to be understood, therefore, that the above-described arrangements are but illustrative of the application of the principles of applicant's invention. Numerous other arrangements may be devised by those skilled in the art without departing from the spirit and scope of the invention.

What is claimed is:

1. A switching circuit comprising a first substantially hourglass-shaped housing having two compartments separated by a restricted passage, a globule of electrically conductive material in one of said compartments, electrically conductive contacts disposed in at least one of said compartments so as to be bridged by said conductive material when said material is in said one compartment, individual fluid pressure paths associated with each of said compartments, nonconductive, fluid in said paths, fluid logic means for increasing the fluid pressure in a selected one of said paths sufficiently to force said conductive material from the compartment associated with said selected path through said restricted passage into the other of said compartments, foraminous means respectively coupling said fluid pressure paths to said compartments for permitting the passage of said nonconductive fluid therethrough and for preventing the passage of said conductive material therethrough, a second substantially hourglass-shaped housing having two compartments separated by a restricted passage, a globule of electrically conductive material in one of said second housing compartments, electrically conductive contacts disposed in at least one of said second housing compartments so as to be bridged by said conductive material when said material is in said one second housing compartment, and foraminous means intercoupling said second housing with said first housing such that said increasing of the fluid pressure in a selected one of said fluid pressure paths by said fluid logic means is sufficient to force said conductive material in said first housing from one compartment into the other compartment thereof and to force said conductive material in said second housing from one compartment into the other compartment thereof.

2. A switching circuit in accordance with claim 1 wherein said last-mentioned intercoupling means comprises means connecting said other compartment of said first housing to said one compartment of said second housing, said one compartment of said first housing and said other compartment of said second housing being respectively connected to said individual fluid pressure paths.

3. A switching circuit comprising a first housing having two compartments separated by a restricted passage, electrically conductive material in one of said compartments, electrically conductive contacts disposed in at least one of said compartments so as to be bridged by said conductive material when said material is in said one compartment, individual fluid pressure paths associated with each of said compartments, nonconductive fluid in said paths, fluid logic means for increasing the fluid pressure in a selected one of said paths sufficiently to force said conductive material from the compartment associated with said selected path through said restricted passage into the other of said compartments, and means respectively coupling said fluid pressure paths to said compartments for permitting the passage of said nonconductive fluid therethrough and for preventing the passage of said conductive material therethrough, said coupling means comprising foraminous material means interposed serially between each of said fluid pressure paths and a respective one of said compartments, said foraminous material means comprising at least two layers, one of said layers being substantially less thick and having a substantially smaller pore size than the other of said layers.

4. A switching circuit comprising a first housing having two compartments separated by a restricted passage, electrically conductive material in one of said compartments, electrically conductive contacts disposed in at least one of said compartments so as to be bridged by said conductive material when said material is in said one compartment, individual fluid pressure paths associated with each of said compartments, nonconductive fluid in said paths, fluid logic means for increasing the fluid pressure in a selected one of said paths sufficiently to force said conductive material from the compartment associated with said selected path through said restricted passage into the other of said compartments, and foraminous material means respectively coupling said fluid pressure paths to said compartments for permitting the passage of said nonconductive fluid therethrough and for preventing the passage of said conductive material therethrough, said foraminous material means coupling said fluid pressure paths to said compartments comprising a first foraminous material having a pore size insufficiently small for preventing the passage of conductive material therethrough and a second foraminous material serially disposed relative to said first foraminous material between each of said fluid pressure paths and a respective one of said compartments, said second foraminous material being substantially less thick than said first foraminous material and having a pore size sufficiently small to prevent the passage of said conductive material therethrough.

References Cited

UNITED STATES PATENTS

| | | | |
|---|---|---|---|
| 2,611,057 | 9/1952 | Slonneger ---------- | 200—81.6 |
| 3,057,551 | 10/1962 | Etter. | |
| 3,250,868 | 5/1966 | Worth. | |
| 3,328,543 | 6/1967 | Johnston et al. ------ | 200—81.6 |

FOREIGN PATENTS 6401498 8/1964 Netherlands.

OTHER REFERENCES

Truslove, "Hydraulic Memory Device," IBM Bulletin, vol. 6, No. 6, August 1963, p. 32.

Langley, "Modular Pneumatic Logic," IBM Tech. Disc. Bull., vol. 6, No. 5, October 1963.

Mitchell et al, "Fluid Binary Memory Cell," IBM Tech. Disc. Bull., vol. 6, No. 5, August 1965.

ROBERT SCHAEFER, Primary Examiner

D. SMITH, Jr., Assistant Examiner

U.S. Cl. X.R.

235—201; 137—81.5; 200—152